United States Patent
Nakajima et al.

(10) Patent No.: US 6,346,348 B1
(45) Date of Patent: Feb. 12, 2002

(54) RECHARGEABLE LITHIUM BATTERY WITH A LITHIUM MOLYBDENUM OXIDE ELECTRODE

(75) Inventors: Hiroshi Nakajima, Hirakata; Hiroshi Watanabe, Sumoto; Shin Fujitani, Hirakata, all of (JP)

(73) Assignee: Sanyo Electric Co., Inc., Moriguchi (JP)

( * ) Notice: Subject to any disclaimer, the term of this patent is extended or adjusted under 35 U.S.C. 154(b) by 0 days.

(21) Appl. No.: 09/498,008

(22) Filed: Feb. 4, 2000

(30) Foreign Application Priority Data

Feb. 9, 1999 (JP) .......................................... 11-031651

(51) Int. Cl.⁷ ................................................ H01M 4/48
(52) U.S. Cl. ................................. 429/231.5; 429/231.1; 429/231.95
(58) Field of Search ...................... 429/231.5

(56) References Cited

U.S. PATENT DOCUMENTS

| | | | | |
|---|---|---|---|---|
| 3,804,672 A | * | 4/1974 | Dey | 136/20 |
| 3,808,052 A | * | 4/1974 | Dey | 436/20 |
| 4,710,439 A | * | 12/1987 | Tarascon | 429/194 |
| 5,750,288 A | * | 5/1998 | Xie | 429/229 |
| 5,783,333 A | * | 7/1998 | Mayer | 409/233 |
| 5,985,488 A | * | 11/1999 | Mitate | 429/223 |
| 6,040,089 A | * | 3/2000 | Manev | 429/231.1 |
| 6,267,943 B1 | * | 7/2001 | Manev | 423/599 |

FOREIGN PATENT DOCUMENTS

| | | | | |
|---|---|---|---|---|
| JP | 08241707 | | 9/1996 | |
| WO | WO-9701191 A | * | 1/1997 | ........... H01M/2/04 |

OTHER PUBLICATIONS

Acta Cryst.(1976), A32, pp. 751–767, "Revised Effective Ionic Radii and Systematic Studies of Interatomic Distances in Halides and Chalcogenides", by R. D. Shannon.

Extended Abstracts, Electrochem. Soc. Fall Meet, 1998, p. 207 "Synthesis and Electrochemical Properties of Lithium Molybdenum Oxides" by H. Kobayashi et al. (as noted in the specification).

* cited by examiner

Primary Examiner—Stephen Kalafut
Assistant Examiner—Mark Ruthkosky
(74) Attorney, Agent, or Firm—W. F. Fasse; W. G. Fasse

(57) ABSTRACT

A rechargeable lithium battery has a positive electrode containing hexagonal-structured lithium molybdenum oxide as an active material. The lithium molybdenum oxide, on charge and discharge, is represented by the formula $Li_xM_yMo_{1-y}O_3$, where M is at least one element selected from the group consisting of Al, Ti, V, Mn, Fe, Co, Ni and Nb, x satisfies the relationship $0.7 \leq x \leq 2.2$ and can be varied within this range by storage and release of lithium ions during charge and discharge, and y satisfies the relationship $0 < y \leq 0.50$.

7 Claims, 2 Drawing Sheets

RECHARGEABLE LITHIUM BATTERY WITH A LITHIUM MOLYBDENUM OXIDE ELECTRODE

BACKGROUND OF THE INVENTION

1. Field of the Invention

The present invention relates to a rechargeable lithium battery incorporating a positive electrode comprised of hexagonal-structured lithium molybdenum oxide active material and also to a positive electrode material (active material of a positive electrode) for rechargeable lithium batteries.

2. Description of Related Art

The molybdenum oxides conventionally known as useful positive electrode materials for rechargeable lithium batteries are $MoO_2$ and $MoO_3$. However, these positive electrode materials undergo significant changes in crystal structure with repetitive charge-discharge cycling, which has been a problem.

In order to overcome the problem, the use of $Li_2MoO_3$, which has a more stable hexagonal crystal structure, for positive electrode material have been investigated (See, for example, Extended Abstracts, Electrochem. Soc. Fall Meet, 1998, p. 207). Hexagonal-structured $Li_2MoO_3$ has a space group $R\bar{3}m$ where Li is present at $3a$ sites, Mo and Li at $3b$ sites and O at $6c$ sites. A major proportion of Li present at $3b$ sites is not stored or released during charge and discharge, which contributes to the holding or retention of crystal structure. This conceivably suppresses the change in crystal structure with charges and discharges.

However, the stability in crystal structure of $Li_2MoO_3$ has been still insufficient. Therefore, there is a need for a positive electrode material which results in the provision of improved charge-discharge cycling characteristics.

SUMMARY OF THE INVENTION

It is an object of the present invention to provide a rechargeable lithium battery which exhibits improved charge-discharge cycling characteristics and a positive electrode material for use in rechargeable lithium batteries.

The rechargeable lithium battery of the present invention has a positive electrode containing hexagonal-structured lithium molybdenum oxide as active material. The lithium molybdenum oxide, on charge and discharge, is represented by a formula $Li_xM_yMo_{1-y}O_3$, where M is at least one element selected from the group consisting of Al, Ti, V, Mn, Fe, Co, Ni and Nb, x satisfies the relationship $0.7 \leq x \leq 2.2$ and can be varied within this range by storage and release of lithium ions during charge and discharge, and y satisfies the relationship $0 < y \leq 0.50$.

In the present invention, the element M which has been substituted for a part of molybdenum in lithium molybdenum oxide, i.e., either one of the above-listed eight elements, can exist in the form of a trivalent or tetravalent ion having an ionic radius of 0.050–0.070 nm in six-coordination (Acta Cryst., A32, pp. 751–767). Thus the element M is similar in property to molybdenum (Mo).

As stated above, the positive electrode material of the present invention is characterized as containing the lithium molybdenum oxide in which Mo has been partly replaced by a specific element-such as Al. In the above-specified compositional formula, x satisfies the relationship $0.7 \leq x \leq 2.2$. The departure of x from this specified range may result in a marked reduction of charge-discharge cycling characteristics. Also, y satisfies the relationship $0 < y \leq 0.50$. A value of higher than 0 is assigned to y because when molybdenum is partly replaced by the substituting element, a bond strength between oxygen located at $6c$ sites and the elements located at $3b$ sites of crystal structure, i.e., the substituting element and remaining molybdenum, is increased to stabilize the crystal structure, resulting in obtaining the effect of the present invention. Also, a value of y is not permitted to exceed 0.50 because for y>0.50, a crystal structure is hardly maintained in hexagonal form and becomes unstable. As will be discussed later, it is more preferred that y satisfies the relationship $0.10 \leq y \leq 0.40$.

In the compositional formula $Li_xM_yMo_{1-y}O_3$, the oxygen stoichiometry is 3. However in actual cases, the oxygen stoichiometry is varied generally within the range of 2.8–3.2 depending upon the calcining temperature and period used in the preparation of the lithium molybdenum oxide. For the purpose of the present invention, the lithium molybdenum oxide as represented by the compositional formula $Li_xM_yMo_{1-y}O_3$ encompasses the cases where the oxygen stoichiometry is varied within the above-specified range.

The element M present in the lithium molybdenum oxide for use in the present invention can be selected from the aforementioned eight elements. Preferably, M may be at least one element selected from the group consisting of Mn, Fe, Co and Ni. The use of any of these four elements for the element M further suppresses the change in crystal structure with charge-discharge cycling, resulting in further improving charge-discharge cycle characteristics. Therefore, the particularly preferred for use in the present invention is the lithium molybdenum oxide of the above-specified compositional formula where M is at least one element selected from the group consisting of Mn, Fe, Co and Ni, and y is between 0.10 and 0.40. If these conditions are properly satisfied, the change in crystal structure with charge-discharge cycling is further suppressed to result in further improved charge-discharge cycle characteristics.

The positive electrode for use in the present battery can be fabricated by utilizing the aforementioned lithium molybdenum oxide as active material. Generally, a powder of lithium molybdenum oxide, optionally in combination with a binder and/or an electrical conductor, is pressed in mold into shapes. The lithium molybdenum oxide powder has a specific surface area preferably in the range of 0.5–6.0 $m^2/g$, more preferably in the range of 1.0–5.0 $m^2/g$, as determined by a BET's adsorption method using a nitrogen gas. If the BET specific surface area falls below the above-specified range, the excessively small specific surface area of the positive electrode material may lower the charge-discharge reactivity thereof. On the other hand, if the BET specific surface area goes beyond the above-specified range, the positive electrode material, because of its excessively high reactivity, may be caused to partly dissolve into an electrolyte solution.

An important feature of the present invention resides in its utilization of a specific positive electrode material for providing rechargeable lithium batteries which exhibit excellent charge-discharge cycle characteristics. For other complementary components, such as a negative electrode and an electrolyte, any materials conventionally known in the art can be used, for example.

Examples of negative electrode materials include metallic lithium; lithium alloys such as a lithium-aluminum alloy, lithium-lead alloy and lithium-tin alloy; carbon materials such as graphite, coke and calcined organic substances; and metal oxides, such as $SnO_2$, $SnO$, $TiO_2$, which have lower electric potentials compared to the positive electrode materials.

Examples of useful non-aqueous electrolyte solvents include high-boiling solvents such as ethylene carbonate (EC), propylene carbonate (PC), vinylene carbonates (VC) and butylene carbonate (BC); and mixed solvents of any of those high-boiling solvents and one or more of the following low-boiling solvent: dimethyl carbonate (DMC), diethyl carbonate (DEC), ethyl methyl carbonate (EMC), 1,2-diethoxyethane (DEE), 1,2-dimethoxyethane (DMC) and ethoxymethoxy ethane (EME).

Examples of suitable non-aqueous electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and any combination thereof.

The present battery includes a positive electrode containing, as its active material, the aforementioned lithium molybdenum oxide which undergoes little change in crystal structure during storage and release of lithium ions, so that the reduction of discharge capacity with charge-discharge cycling can be effectively suppressed. Therefore, in accordance with the present invention, a rechargeable lithium battery can be provided which exhibits excellent charge-discharge cycle characteristics.

The positive electrode material of the present invention contains the lithium molybdenum oxide having a hexagonal structure and is particularly suitable for use in rechargeable lithium batteries. Characteristically, molybdenum in the lithium molybdenum oxide has been partly substituted by the metal which is at least one element selected from the group consisting of Al, Ti, V, Mn, Fe, Co, Ni and Nb.

Preferably up to 50 atomic %, more preferably between 10 and 40 atomic % of an initial content of molybdenum has been substituted. Specifically, any of the above-specified elements can be substituted for a part of molybdenum in lithium molybdenum oxide, for example, represented by the compositional formula $Li_2MoO_3$. It should be recognized that the lithium and oxygen stoichiometries will be varied depending upon the blending proportions of materials used, calcining temperature, calcining period and the like.

More specifically, the positive electrode material of the present invention contains the lithium molybdenum oxide, as represented by the aforementioned compositional formula $Li_xM_yMo_{1-y}O_3$, which has been previously described as being useful active material for the rechargeable lithium battery of the present invention.

The use of the positive electrode material of the present invention effectively suppresses the reduction of discharge capacity with repetitive charge-discharge cycling, resulting in the provision of rechargeable lithium batteries which exhibit improved charge-discharge cycle performance characteristics.

DESCRIPTION OF THE PREFERRED EXAMPLES

The present invention is now described in more detail with reference to preferred examples. It will be recognized that the following examples merely illustrate the practice of the present invention but are not intended to be limiting thereof. Suitable changes and modifications can be effected without departing from the scope of the present invention.

EXPERIMENT 1

Rechargeable lithium batteries in accordance with the present invention, as well as a comparative battery, were manufactured to compare the charge-discharge cycle characteristics thereof.

EXAMPLE 1

(A) Preparation of a Positive Electrode

Lithium hydroxide (LiOH), aluminum oxide ($Al_2O_3$) and molybdenum trioxide ($MoO_3$) were mixed in such a manner that a ratio of numbers of Li, Al and Mo atoms was brought to 2.00:0.20:0.80. The mixture was calcined, under the flow of hydrogen gas, at 800° C. for 48 hours, then cooled to room temperature, and finally jet milled to prepare powder-form lithium molybdenum aluminum oxide (positive electrode material), as represented by a compositional formula $Li_2Al_{0.02}Mo_{0.80}O_3$, which had a BET specific surface area of 3.0 m²/g.

The BET specific surface area was determined by a BET's adsorption method using a nitrogen gas (hereinafter referred to simply as the BET specific surface area).

The X-ray powder diffraction revealed the hexagonal crystal structure of the lithium molybdenum aluminum oxide as prepared above.

A mixture of the above-prepared lithium molybdenum aluminum oxide, acetylene black as an electronic conductor, and poly(vinylidene fluoride) as a binder, in the ratio by weight of 90:6:4, was kneaded to prepare a cathode mix which was subsequently pressed in mold at a pressure of 2 t/cm² into the disc form. The disc-form mix was then heat treated under vacuum at 250° C. for 2 hours to prepare a positive electrode.

(B) Preparation of a Negative Electrode

A disc-form negative electrode having a diameter of 20 mm was punched out of a rolled lithium-aluminum alloy plate.

(C) Preparation of an Electrolyte Solution

Ethylene carbonate, dimethyl carbonate and ethyl methyl carbonate were blended in proportions by volume of 1:2:1 to provide a mixed solvent. $LiPF_6$ was dissolved in the mixed solvent to a concentration of 1 mole/l. As a result, an electrolyte solution was prepared.

(D) Assembly of a Rechargeable Lithium Battery

A flat-type rechargeable lithium battery (battery A-1) was assembled using the above-prepared positive electrode, negative electrode and electrolyte solution. A ratio in capacity of the positive to negative electrode was set at 1:1.1.

Figure 1:
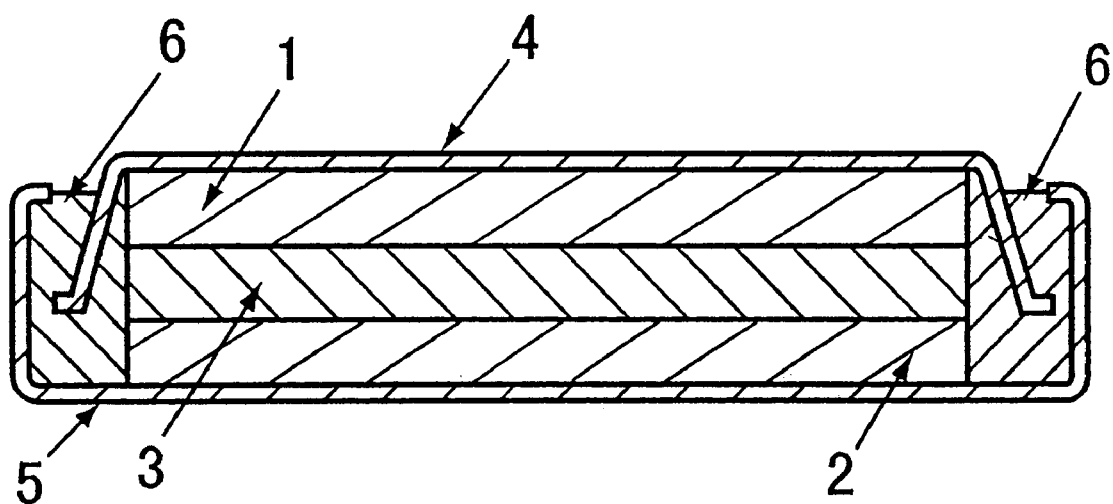
FIG. 1 is a sectional view, illustrating a flat-type rechargeable lithium battery in accordance with one embodiment of the present invention.

FIG. 1 is a sectional view of the battery A-1 as assembled. As shown in FIG. 1, a positive electrode 1, an opposing negative electrode 2 and a separator 3 interposed therebetween are housed in a battery can which includes a positive can 4 and a negative can 5. The separator 3 is a lithium-ion conducting polypropylene film. The positive and negative electrodes 1 and 2 are electrically connected to the positive and negative cans 4 and 5, respectively, such that a chemical energy produced inside the battery is delivered in the form of electric energy to the exterior of the battery. An electrically insulating polypropylene gasket 6 physically separates the respective peripheries of the positive can 4 and the negative can 5 to prevent short-circuiting thereof.

EXAMPLES 2–8

The procedure of Example 1 was repeated, except that, instead of aluminum oxide ($Al_2O_3$), titanium dioxide ($TiO_2$), divanadium pentoxide ($V_2O_5$), manganese dioxide ($MnO_2$), iron oxide (FeO), tricobalt tetroxide ($Co_3O_4$), nickel oxide (NiO) or diniobium pentoxide ($Nb_2O_5$) was mixed with lithium hydroxide (LiOH) and molybdenum trioxide ($MoO_3$) so as to result in the same ratio of numbers of atoms as in Example 1, to obtain seven types of lithium molybdenum oxides, as represented by the compositional formula $Li_2M_{0.20}Mo_{0.80}O_3$ (M=Ti, V, Mn, Fe, Co, Ni or Nb), which had a BET specific surface area of 3.0 $m^2/g$. The X-ray powder diffraction revealed the hexagonal crystal structure of all these lithium molybdenum oxides as prepared above.

Batteries A-2 through A-8 were assembled by using those seven different types of lithium molybdenum oxides as active materials of their respective positive electrodes. Other than the type of positive electrode material used, those batteries were similar in construction to the battery A-1 obtained in Example 1.

COMPARATIVE EXAMPLE 1

Lithium hydroxide and molybdenum trioxide were mixed in a molar ratio of 2.00:1.00. The mixture was calcined, under flow of hydrogen gas, at 800° C. for 48 hours, cooled to room temperature, and then jet milled to prepare powder-form lithium molybdenum oxide (positive electrode material), as represented by the compositional formula $Li_2MoO_3$, which had a BET specific surface area of 3.0 $m^2/g$. The X-ray powder diffraction revealed the hexagonal crystal structure of the lithium molybdenum oxide as prepared above.

Comparative battery X-1 was assembled using the above-prepared lithium molybdenum oxide as the active material of its positive electrode. Other than the type of positive electrode material used, the comparative battery X-1 was similar in construction to the battery A-1 obtained in Example 1.

Cycle Characteristics of Batteries

Each battery was charged at 0.20 $mA/cm^2$ to 4.3 V and then discharged at 0.20 $MA/cm^2$ to 1.5 V. After this cycle was repeated 20 times, a capacity retention (%) after 20 cycles was determined according to the following equation:

Capacity retention (%)=$DC_{20}/DC_1 \times 100$ wherein $DC_{20}$ is a 20th-cycle discharge capacity and $DC_1$ is a 1st-cycle discharge capacity.

The results are shown in the following Table 1.

TABLE 1

| Battery Designation | Compositional Formula of Positive Electrode Material | Capacity Retention (%) |
| --- | --- | --- |
| A-1 | $Li_2Al_{0.2}Mo_{0.8}O_3$ | 85 |
| A-2 | $Li_2Ti_{0.2}Mo_{0.8}O_3$ | 86 |
| A-3 | $Li_2V_{0.2}Mo_{0.8}O_3$ | 86 |

TABLE 1-continued

| Battery Designation | Compositional Formula of Positive Electrode Material | Capacity Retention (%) |
| --- | --- | --- |
| A-4 | $Li_2Mn_{0.2}Mo_{0.8}O_3$ | 94 |
| A-5 | $Li_2Fe_{0.2}Mo_{0.8}O_3$ | 91 |
| A-6 | $Li_2Co_{0.2}Mo_{0.8}O_3$ | 91 |
| A-7 | $Li_2Ni_{0.2}Mo_{0.8}O_3$ | 91 |
| A-8 | $Li_2Nb_{0.2}Mo_{0.8}O_3$ | 85 |
| X-1 | $Li_2MoO_3$ | 74 |

As appreciated from Table 1, the batteries A-1 through A-8, in accordance with the present invention, exhibit higher capacity retentions compared to the comparative battery X-1. This is believed due to the following reason: When molybdenum in lithium molybdenum oxide is partly substituted by a specific element, a bond strength between oxygen located at 6c sites and the elements located at 3b sites of a crystal structure, i.e., the substituting element and remaining molybdenum, is increased to stabilize the crystal structure, so that the strain produced in the crystal structure with repetitive charge-discharge cycling is lessened.

In particular, the batteries A-4 through A-7 exhibit higher levels of capacity retention, among the batteries of the present invention. This demonstrates that the use of Mn, Fe, Co and Ni for the substituting element M in the formula $Li_2M_{0.2}Mo_{0.8}O_3$ is particularly preferred.

EXPERIMENT 2

In Experiment 2, the relationship of y in the formula $Li_xM_yMo_{1-y}O_3$ and capacity retention was investigated.

Lithium hydroxide (LiOH), manganese dioxide ($MnO_2$) and molybdenum trioxide ($MoO_3$) were mixed in such a way that a ratio of numbers of Li, Mn (substituting element) and Mo atoms was brought to 2.00:0.05:0.95, 2.00:0.10:0.90, 2.00:0.30:0.70, 2.00:0.40:0.60, 2.00:0.50:0.50 or 2.00:0.55:0.45. The mixture was calcined, under the flow of hydrogen gas, at 800° C. for 48 hours, then cooled to room temperature, and finally jet milled to prepare powder-form lithium molybdenum manganese oxide (positive electrode material), as represented by the compositional formula $Li_2Mn_{0.05}Mo_{0.95}O_3$, $Li_2Mn_{0.10}Mo_{0.90}O_3$, $Li_2Mn_{0.30}Mo_{0.70}O_3$, $Li_2Mn_{0.40}Mo_{0.60}O_3$, $Li_2Mn_{0.50}Mo_{0.50}O_3$ or $Li_2Mn_{0.55}Mo_{0.45}O_3$, which had a BET specific surface area of 3.0 $m^2/g$. The X-ray powder diffraction revealed the hexagonal crystal structure of all the lithium molybdenum manganese oxides as prepared above.

Batteries B-1 (y=0.05), B-2 (y=0.10), B-3 (y=0.30), B-4 (y=0.40) and B-5 (y=0.50), respectively in accordance with the present invention, as well as a comparative battery X-2 (y=0.55), were assembled by using those six different stoichiometries of lithium molybdenum manganese oxides as active materials of their respective positive electrodes. Other than the type of positive electrode material used, those batteries were similar in construction to the battery A-1 obtained in Example 1.

Figure 2:
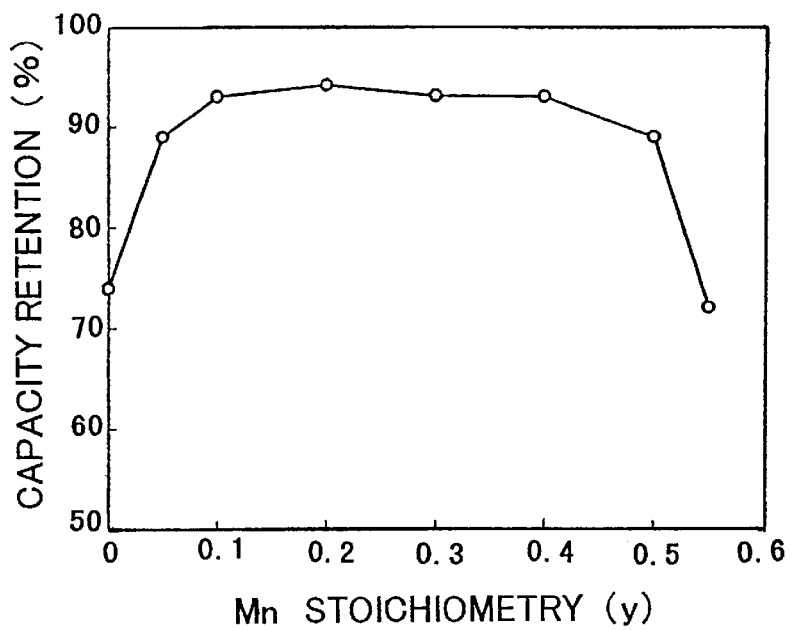
FIG. 2 is a graph showing the relationship of y (stoichiometry of the substituting element) and capacity retention of the lithium molybdenum oxide.

Each battery was subjected to the same cycle test as conducted in Experiment 1, and its capacity retention (%) after 20 cycles was determined. The results are shown in FIG. 2. For comparative purposes, the capacity retentions for the battery A-4 (y=0.20) of the present invention and the comparative battery X-1 (y=0) are also shown in FIG. 2.

As can be seen from FIG. 2, the batteries of the present invention have higher capacity retensions than the comparative batteries X-1 and X-2. That is, significantly improved capacity retention is obtained for batteries when their positive electrodes contain $Li_2M_yMo_{1-y}O_3$ ($0<y\leq0.50$) in accordance with the present invention than when their positive electrodes contain $Li_2M_yMo_{1-y}O_3$ ($y=0$ or $y>0.50$). As discussed earlier, the increased capacity retentions of batteries using the positive electrode materials of the formula $Li_2M_yMo_{1-y}O_3$ with $y>0$ are believed to result from the increased bond strength between oxygen located at $6c$ sites and the elements located at $3b$ sites of a crystal structure, i.e., the substituting element and remaining molybdenum, which stabilizes the crystal structure so that the strain produced therein with repetitive charge-discharge cycling is reduced. On the other hand, the reduced capacity retention of the battery using the positive electrode material of the formula $Li_2M_yMo_{1-y}O_3$ with $y>0.5$ is believed to result from the excess substitution of the element M for Mo, by which a crystal structure is hardly maintained in hexagonal form and becomes unstable. Also, it was observed in X-ray powder diffraction that, for $y>0.5$, the positive electrode material showed a marked increase in size of half-width of peaks.

Particularly when $0.10\leq y\leq0.40$, the batteries of the present invention exhibit the further increased levels of capacity retention. This demonstrates that y in the compositional formula $Li_2M_yMo_{1-y}O_3$ is more preferably between 0.10 and 0.40.

EXPERIMENT 3

In Experiment 3, the relationship of BET specific. surface area of the positive electrode material and capacity retention was investigated.

Lithium hydroxide (LiOH), manganese dioxide ($MnO_2$) and molybdenum trioxide ($MoO_3$) were mixed in such a manner that a ratio of numbers of Li, Mn (substituting element) and Mo atoms was brought to 2.00:0.20:0.80. The mixture was calcined, under the flow of hydrogen gas, at 800° C. for 48 hours, cooled to room temperature, and then jet milled at the six different time schedules to prepare six different sizes of lithium molybdenum manganese oxides (positive electrode materials), as represented by the compositional formula $Li_2MnO_{0.20}Mo_{0.80}O_3$, which had BET specific surface areas of 0.1, 0.5, 1.0, 5.0, 6.0 and 7.0 m$^2$/g, respectively. The X-ray powder diffraction revealed the hexagonal crystal structure of all the lithium molybdenum manganese oxides as prepared above.

Batteries C-1 through C-6, respectively in accordance with the present invention, were assembled by using the six different sizes of lithium molybdenum oxides (BET specific surface areas=0.1, 0.5, 1.0, 5.0, 6.0 and 7.0 m$^2$/g) as active materials of their respective positive electrodes. Other than the types of positive electrode materials used, those batteries were similar in construction to the battery A-1 obtained in Example 1.

Figure 3:
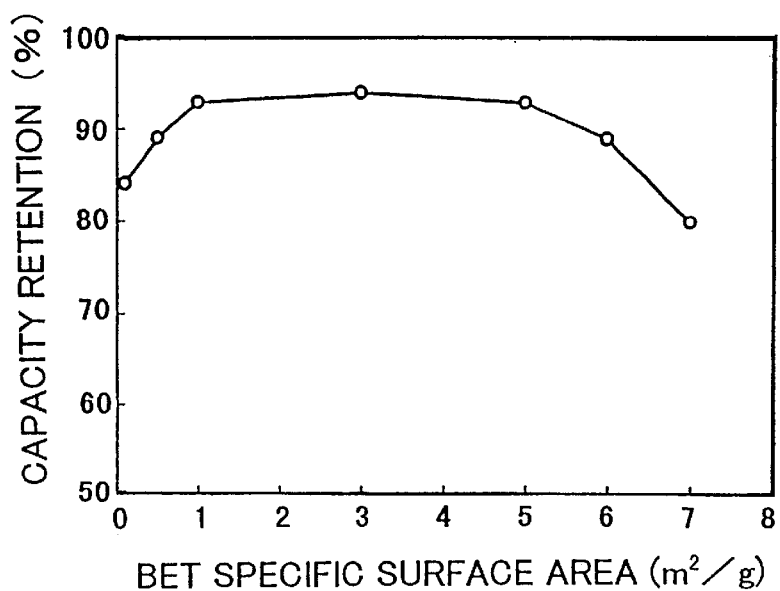
FIG. 3 is a graph showing the relationship of BET specific surface area and capacity retention of the lithium molybdenum oxide.

Each battery was subjected to the same cycle test as conducted in Experiment 1, and its capacity retention (%) after 20 cycles was determined. The results are shown in FIG. 3. For comparative purposes, the capacity retention for the battery A-4 (BET specific surface area=3.0 m$^2$/g) of the present invention is also shown in FIG. 3.

As can be seen from FIG. 3, the batteries A-4 and C-2 through C-5, which used the lithium molybdenum oxides having BET specific surface areas within the range of 0.5–6.0 m$^2$/g as active materials of their respective positive electrodes, exhibit higher capacity retentions compared to the batteries C-1 and C-6 which used the lithium molybdenum oxides having BET specific surface areas outside the above-specified range as active materials of their respective positive electrodes. This demonstrates that a BET specific surface area of the positive electrode material, i.e., the lithium molybdenum oxide, is preferably in the range of 0.5–6.0 m$^2$/g.

The reduced capacity retention of the battery C-1 using the lithium molybdenum manganese oxide having a BET specific surface area of below 0.5 is believed due to the reduced specific surface of the lithium molybdenum manganese oxide, which lowered the charge-discharge reactivity thereof. On the other hand, the reduced capacity retention of the battery C-6 using the lithium molybdenum manganese oxide having a BET specific surface area of exceeding 6.0 m$^2$/g is believed due to the reduced particle size of the lithium molybdenum manganese oxide, which allowed a part thereof to dissolve into the electrolyte solution.

Particularly when the BET specific surface area is in the range of 1.0–5.0 m$^2$/g, the batteries of the present invention exhibit the further increased capacity retentions. This demonstrates that a BET specific surface area of the lithium molybdenum oxide is more preferably in the range of 1.0–5.0 m$^2$/g.

While explained by referring to flat-type rechargeable lithium batteries, the rechargeable lithium batteries of the present invention can be designed in any other battery constructions such as a cylindrical configuration.

The rechargeable lithium batteries of the present invention can suppress the reduction of discharge capacity with repetitive charge-discharge cycling, and therefore exhibit the improved charge-discharge cycle characteristics.

What is claimed is:

1. A rechargeable lithium battery having a positive electrode containing hexagonal-structured lithium molybdenum oxide as active material, wherein said lithium molybdenum oxide, on charge and discharge, is represented by the formula $Li_xM_yMo_{1-y}O_3$, where M is at least one element selected from the group consisting of Al, Ti, V, Mn, Fe, Co, Ni and Nb, x satisfies the relationship $0.7\leq x\leq2.2$ and can be varied within this range by storage and release of lithium ions during charge and discharge, and y satisfies the relationship $0<y\leq0.50$.

2. The rechargeable lithium battery of claim 1, wherein said M in the formula is at least one element selected from the group consisting of Mn, Fe, Co and Ni.

3. The rechargeable lithium battery of claim 1, wherein said lithium molybdenum oxide has a BET specific surface area within the range of 0.5–6.0 m$^2$/g, when determined by an adsorption method using a nitrogen gas.

4. A positive electrode material for use in rechargeable lithium batteries, comprising hexagonal-structured lithium molybdenum oxide with a metal that has been partly substituted for molybdenum in said lithium molybdenum oxide, and wherein said metal consists of at least one element selected from the group consisting of Al, Ti, V, Mn, Fe, Co, and Nb.

5. The positive electrode material of claim 4, wherein said lithium molybdenum oxide has a BET specific surface area within the range of 0.5–6.0 m$^2$/g, when determined by an adsorption method using a nitrogen gas.

6. A positive electrode material comprising hexagonal-structured lithium molybdenum oxide, for use in rechargeable lithium batteries, wherein said lithium molybdenum oxide, on charge and discharge, is represented by the formula $Li_xM_yMo_{1-y}O_3$, where M is at least one element selected from the group consisting of Al, Ti, V, Mn, Fe, Co, Ni and Nb, x satisfies the relationship $0.7\leq x\leq2.2$ and can be varied within this range by storage and release of lithium ions during charge and discharge, and y satisfies the relationship $0<y\leq0.50$.

7. The positive electrode material of claim 6, wherein said lithium molybdenum oxide has a BET specific surface area within the range of 0.5–6.0 m$^2$/g, when determined by an adsorption method using a nitrogen gas.

* * * * *